Patented Apr. 7, 1942

2,278,977

UNITED STATES PATENT OFFICE 2,278,977

DYESTUFFS OF THE ANTHRAQUINONE SERIES

William Dettwyler, Pitman, N. J., assignor to E. I. du Pont de Nemours & Company, Wilmington, Del., a corporation of Delaware No Drawing. Application August 16, 1939, Serial No. 290,383

1 Claim. (Cl. 260—276)

This invention relates to the preparation of dyestuffs of the anthraquinone series, and more particularly to the preparation of new and valuable olive and gray to black dyestuffs of the benzanthronylanthraquinone-acridine series of the general formula:

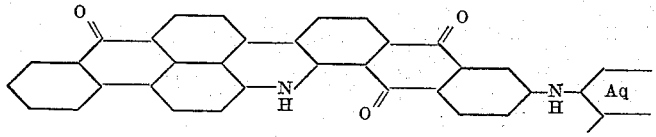

in which Aq stands for a radical of the anthraquinone series. The expression "a radical of the anthraquinone series" is used in this application to refer to those anthraquinone compounds in which the anthraquinone nucleus remains intact and includes anthraquinone and its substitution derivatives except where a condensed ring is attached through the 9- or 10-position of the anthraquinone molecule.

The object of the invention is to prepare new gray dyestuffs which show increased fastness properties over the heretofore known benzanthronyl - amino - anthraquinone dyestuffs and which exhibit good tinctorial power dyeing cotton from the usual alkaline hydrosulfite vats in strong shades.

I have found that new olive and gray-to black dyestuffs may be prepared by condensing 6-chloro-1-(Bz - 1' - benzanthronyl) - aminoanthraquinone with aminoanthraquinones which may or may not contain simple monovalent or ring substituents, and then fusing the anthrimide compound thus formed with alkali to effect ring-closure of both imino groups to what are generally considered to be acridine and carbazole rings.

The aminoanthraquinone compounds that may be condensed with the 6-chloro-1-(Bz-1'-benzanthronyl)-aminoanthraquinone may carry such substituents as arylamino, alkyl or halogen radicals or additional rings such as illustrated by the aminoanthraquinone-benzacridone employed in the following examples.

The following examples are given to illustrate the invention. The parts used are by weight.

Example 1

Thirty-one parts of Bz-1-bromobenzanthrone, 26 parts of 1-amino-6-chloroanthraquinone, 10 parts of soda ash and 1 part of cuprous chloride are refluxed in 400 parts nitrobenzene for 12 hours. 23 parts of 1-aminoanthraquinone and 5 parts of soda ash are added and the heating (at reflux) continued for 16 hours. After cooling to room temperature, the product is filtered off, steam distilled to free it from nitrobenzene, filtered, washed with dilute hydrochloric acid, then with water and dried. It is a dark powder, soluble in concentrated sulfuric acid with a brown color. Twenty parts of this condensation product are introduced at 160° C. into a melt of 100 parts caustic potash and 50 parts methanol. When the charge is completed, the temperature is raised to 180° C. and held there for 1 hour. The melt is then poured in 1000 parts of cold water, then boiled and the color isolated by filtering, washing the cake alkali free and drying. The product is soluble in sulfuric acid with a green color. After pasting from sulfuric acid it dyes cotton from an alkaline hydrosulfite vat in strong olive gray shades. This product has the formula:

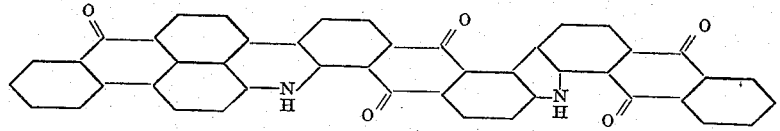

Example 2

Thirty-one parts of Bz-1-bromobenzanthrone, 26 parts of 1-amino-6-chloroanthraquinone, 10 parts soda ash and 1 part of cuprous chloride are heated in 500 parts of nitrobenzene at reflux temperatures for 16 hours. 24 parts of 1:4-diaminoanthraquinone and 5 parts of soda ash are then added and the mass is heated at reflux for 16 more hours. The condensation product which is isolated as in Example 1 is soluble in sulfuric acid with a green-black color.

Into a prepared melt of 100 parts of caustic potash and 50 parts of methanol, 25 parts of the above anthrimide are added at 160° C. and maintained at 175–180° C. for 1 hour. After dilution and boiling to precipitate the color it is filtered off and washed as in Example 1 and dried. It is a black powder soluble in sulfuric acid with a green color and dyes cotton in green-black shades. When the condensation is made with 1:5-diamino-anthraquinone instead of 1:4-diamino-anthraquinone a somewhat redder shade is obtained. The products of this example have the general formula:

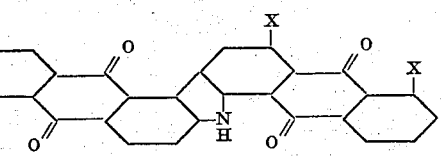

in which one X stands for an amino group and the remaining X stands for hydrogen.

Example 3

Thirty-one parts of Bz-1-bromobenzanthrone are condensed in the usual manner in 400 parts of nitrobenzene with 26 parts of 1-amino-6-chloroanthaquinone, 10 parts of soda ash and one part of cuprous chloride. 34 parts of 5-amino - 2:1(N) - anthraquinone-benzacridone and 5 parts of soda ash are added and the mass heated at reflux temperature for 16 hours. The condensation product is isolated as in Example 1. It is a dark powder soluble in sulfuric acid with a brown color. When this product is fused with methanolic caustic potash as in the foregoing examples a blue-gray dyestuff is obtained which dissolves in concentrated sulfuric acid with a green color. Substitution of the 5-amino-2:1(N) - anthraquinone - benzacridone by 4-amino - 2:1 - (N)-anthraquinone-benzacridone gives an olive dyestuff. The products of this example have the general formula:

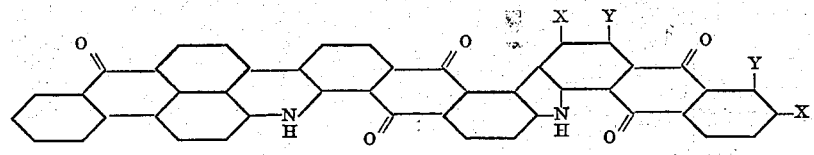

in which one X and Y represent the benzacridone radical

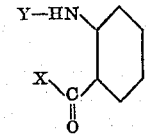

and the remaining X and Y are hydrogen.

Example 4

6-chloro - 1 - (Bz-1'-benzanthronyl)-aminoanthraquinone prepared from 31 parts of Bz-1-bromobenzanthrone and 26 parts of 1-amino-6-chloroanthaquinone without isolation are condensed with 31 parts of 1-amino-4-anilidoanthraquinone. After isolation as in Example 1, the anthrimide is a black powder soluble in sulfuric acid with a blue color. Upon fusion in methanolic caustic potash a gray dyestuff is obtained which is soluble in concentrated sulfuric acid with a green color.

As illustrated in the above examples the ring-closure of the anthrimide compounds should be carried out in alcoholic caustic at temperatures of 150° C. or higher. When lower temperatures are employed ring-closure of the alpha-beta-anthrimide group may not take place, resulting in dyestuffs of different shades and dyeing properties.

I claim:
The dyestuffs of the general formula

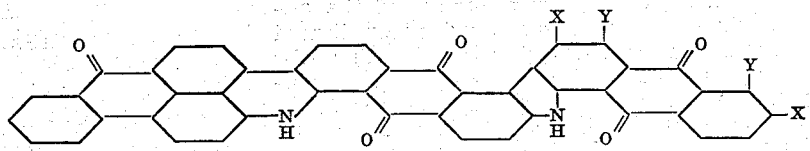

in which one X and Y represent the benzacridone radical

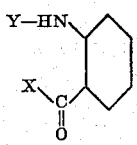

and the remaining X and Y are hydrogen, which dissolves in concentrated sulfuric acid with a green color and dye cotton from an alkaline hydrosulfite vat in gray to olive shades.

WILLIAM DETTWYLER.